July 8, 1941.　　　B. C. ROEHRL　　　2,248,309
FILM SPOOL HUB
Filed May 20, 1938
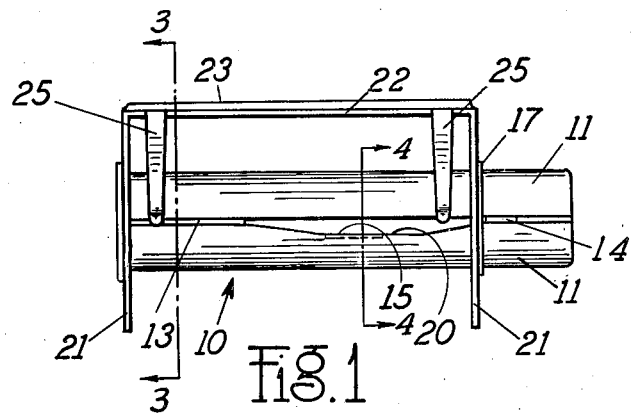
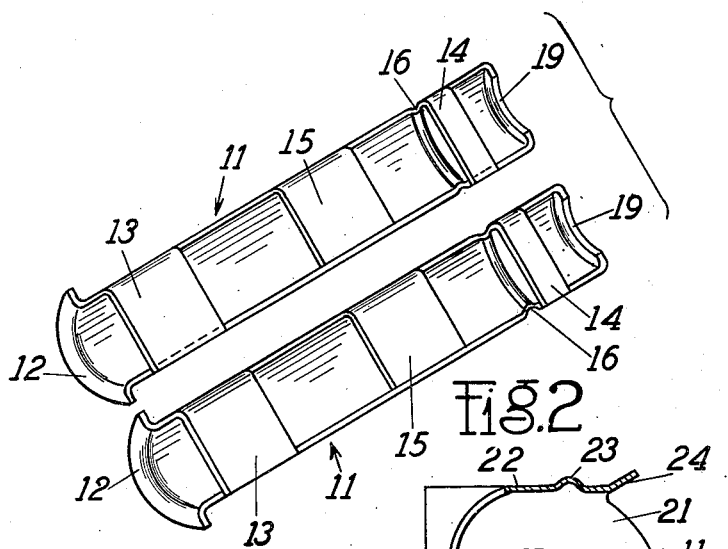
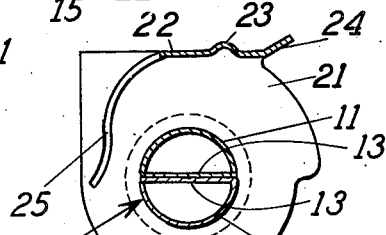
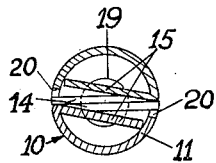
INVENTOR.
BRUNO C. ROEHRL
BY
ATTORNEY.

Patented July 8, 1941

2,248,309

UNITED STATES PATENT OFFICE 2,248,309

FILM SPOOL HUB

Bruno C. Roehrl, Binghamton, N. Y., assignor, by mesne assignments, to General Aniline & Film Corporation, New York, N. Y., a corporation of Delaware Application May 20, 1938, Serial No. 209,043

4 Claims. (Cl. 242—70)

This invention relates to film spools and more particularly to a hub therefor.

A primary object of this invention is the provision of an improved two piece hub for film spools wherein all possibility of slippage and consequent disalignment of the two pieces comprising the hub are precluded.

A further object is the provision of such a hub which may be utilized in conjunction with a support from which the film may be wound across the exposure area of a camera and upon which a film may be wound after completed exposure and removed from the camera for processing.

A further specific object is the provision of such a hub, particularly for use with a "miniature" or "candid" type camera, comprised of a minimum of parts which may be produced with minimum machine operations and at a minimum expense.

A still further object is the provision of an improved two-piece hub for film spools and holders of the type disclosed in applicant's co-pending application, Serial No. 115,084, filed December 10, 1936, now Patent No. 2,160,710 of May 30, 1939 entitled Film spool and holder.

An additional object is the provision of an improved means in association with the hub itself for guiding the connecting end of the film therein.

Other objects will in part be obvious and in part pointed out hereinafter.

The invention accordingly consists in the combinations of elements, arrangements of parts and features of construction all as will be more fully pointed out and disclosed in the accompanying drawing wherein:

Figure 1 is a side elevational view of one form of the improved film spool and its associated holder, Figure 2 is a detail perspective view showing the component parts of the spool hub in separated relation, Figure 3 is a sectional view taken along the line 3—3 of Figure 1 as viewed from the right, and Figure 4 is a sectional view taken along the line 4—4 of Figure 1, as viewed from the left.

Similar reference characters refer to similar parts throughout the several views of the drawing.

Having particular reference now to Figure 2, it will be seen that the film spool and hub generally indicated at 10 are comprised of two identical sections 11 each in the form of an elongated semi-circular channel member which, when placed together, as shown more clearly in Figures 1 and 3, provide a circular hub on which a film may be wound.

Each section 11 is preferably formed of stamped or preformed metal and at one end each is provided with an outwardly turned flange 12 which has adjacent thereto an inwardly turned lip or web 13 extending from one edge of the section across the channel shaft portion thereof to and overlying the opposite edge. At the end of each member 11 opposite flange 12 is a second inwardly turned lip or web 14 which extends across the channel shaft portions thereof to and overlying the opposite edge. Positioned intermediately of webs 13 and 14 on each of members 11 is a third lip or web 15 which extends across the channel shaft portion to, but not overlying the opposite edge thereof.

When the sections 11 are placed together to form the complete hub, webs 13, 14 and 15 lie face to face against each other, as more clearly shown in Figure 3. The webs 13 provide at their adjacent end of the hub an engaging means for the inner end (not shown) of a conventional winding stem (not shown) when the same is pushed inwardly with respect to the hub, whereby the hub may be rotated by such stem. At a point spaced inwardly from the ends of sections 11 opposite the flanges 12, are provided the depressions or grooves 16 (see Figure 2) which, when the sections are placed together to form a hub, provide a continuous groove around the periphery thereof. This groove is for the purpose of receiving a spring ring or retaining means 17 (see Figure 1) which serves to hold the sections together in their hub forming relation.

Those portions of the hub sections which project beyond groove 16 have their ends turned inwardly as at 19 to provide a circular bearing portion at this end of the hub and constitute a positioning device for the spool and its holder within the camera with which it is associated. This projecting end also serves as convenient means for turning the hub for winding or unwinding the film. The sections 11 of the hub are cut away at their free edges, one of which cut away portions is disclosed at 20, to provide openings or slots as shown in Fig. 1 through which the end of a film or its protecting paper backing may be inserted for securing such end to the hub for winding thereon.

Hub 10 is journaled in a holder comprised of parallel flanges 21 which are bent at right angles to a cross piece or bridge 22. The bridge 22 is positioned substantially centrally of hub 10 and extends longitudinally across the same and is provided with a bead portion 23 which serves as a reenforcement. One end of bridge 22 is slightly upturned as at 24 to form a lip for guiding the film to and from hub 10, thus holding the body or picture area of the film away from the bridge to avoid scratching such area. The opposite edge of bridge 22 is provided, adjacent each end, with rearwardly extending spring fingers 25 adapted to lightly or frictionally prevent accidental unwinding of the film.

Flanges 21 are, of course, of a shape to conform to the configuration of that portion of a camera in which they rest.

From the foregoing it will now be seen that there is herein provided a hub for use in conjunction with a holder such as described in applicant's co-pending application Serial Number 115,084, filed December 10, 1936 wherein accidental slippage or entanglement of the two component parts of the hub is completely precluded by webs 13 and 14 and wherein webs 15 serve as efficient guide members for the film or leader strip inserted in slot 21.

Thus it will be seen that there is herein provided a structure which embodies all the objects of this invention and others including many advantages of great practical utility.

As many modifications may be made of the invention herein described and shown and as many embodiments may be made of this modification, it is to be understood that all matter hereinbefore set forth or shown in the accompanying drawing is to be interpreted merely as illustrative and not in a limiting sense.

I claim as my invention:

1. A hub for films comprising two semi-circular channel shaped parts, means to secure said parts together and two webs spaced apart and extending substantially diametrically across said channel in each of said parts and abutting those webs carried by the other of said parts to preclude slippage and consequent interengagement of said parts, said webs extending from one edge of said channels completely across said channels and overlying the opposite edge thereof.

2. A hub for films comprising two semi-circular channel shaped parts, means to secure said parts together, and a plurality of spaced webs in each of said parts abutting those webs carried by the other of said parts to preclude slippage and consequent interengagement of said parts, each of said webs being integral with one edge of its channel member and extending diametrically across said channel to the outer surface of the opposite edge whereby said web is partially supported by said opposite edge.

3. A hub for films comprising two semi-circular channel-shaped parts, means to secure said parts together and two webs spaced apart and extending diametrically substantially completely across said channel in each of said parts and abutting those webs carried by the other of said parts to preclude slippage and consequent interengagement of said parts.

4. A hub for films comprising two semi-circular channel-shaped parts, means to secure said parts together and a plurality of webs spaced apart and extending diametrically substantially completely across said channel in each of said parts and abutting those webs carried by the other of said parts to preclude slippage and consequent interengagement of said parts, each of said parts having cut-away portions and film guides interiorly positioned in said parts adjacent said cut-away portions.

BRUNO C. ROEHRL.